C. C. LEWIS. Improvement in Twine Cutter.
No. 120,652. Patented Nov. 7, 1871.
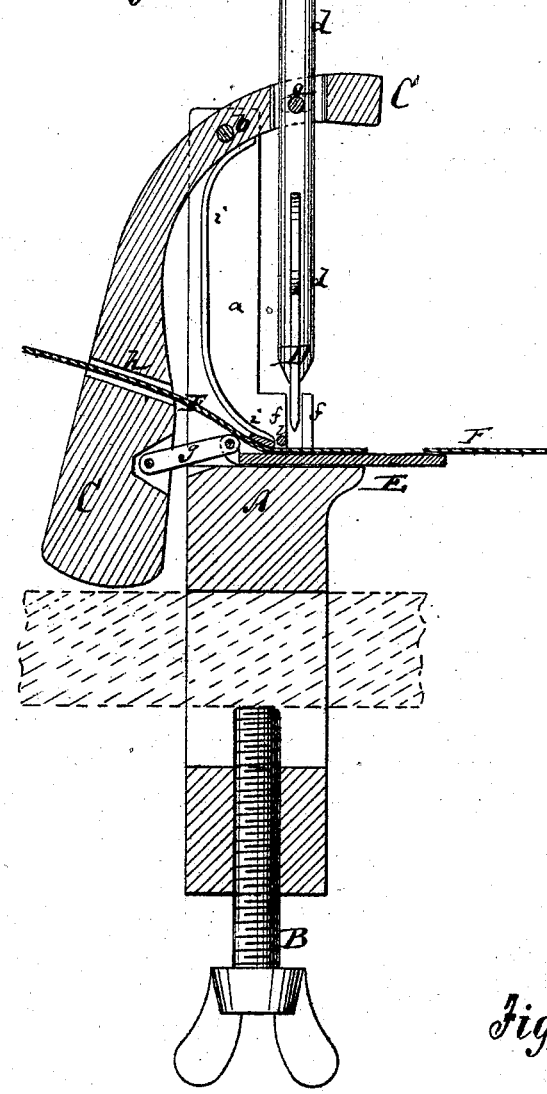
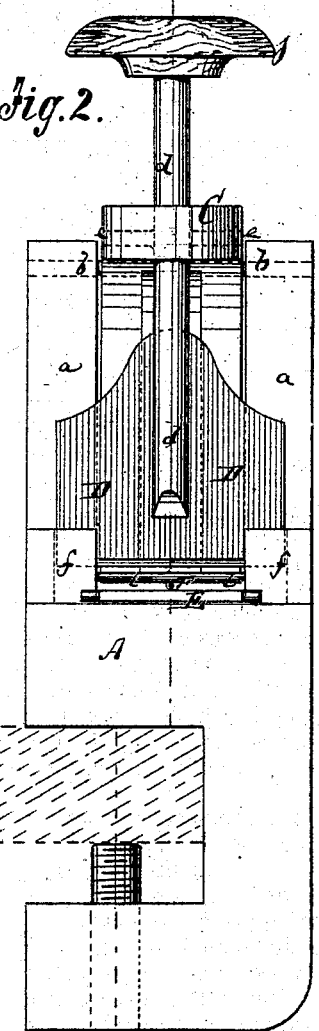
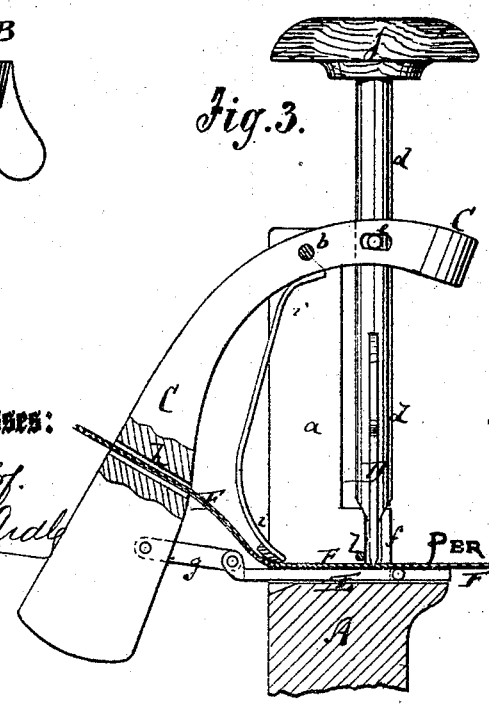
Witnesses:
A Bennersendorf.
Francis McArdle
Inventor:
C. C. Lewis
Munn & Co
Attorneys.
AM. PHOTO-LITHOGRAPHIC CO. N.Y.( OSBORNE'S PROCESS.)

120,652

UNITED STATES PATENT OFFICE.

CHARLES CARRINGTON LEWIS, OF GAINESVILLE, ALABAMA.

IMPROVEMENT IN TWINE-CUTTERS.

Specification forming part of Letters Patent No. 120,652, dated November 7, 1871.

*To all whom it may concern:*

Be it known that I, CHARLES CARRINGTON LEWIS, of Gainesville, in the county of Sumter and State of Alabama, have invented an Improved Twine-Cutter; and I do hereby declare that the following is a full, clear, and exact description thereof, which will enable others skilled in the art to make and use the same, reference being had to the accompanying drawing forming part of this specification.

Figure 1 represents a vertical section of my improved twine-cutter taken on the plane of the line $c\ c$, Fig. 2. Fig. 2 is a front elevation of the same. Fig. 3 is a side view, partly in section, of the same, showing the knife lowered.

Similar letters of reference indicate corresponding parts.

This invention relates to a new simple implement to be used in stores, warehouses, &c., for the purpose of cutting twine and cords used for the tying of packages. The invention consists chiefly in applying the cutter to a pivoted balance-weight, which is connected with a sliding bed on which the twine is cut. The bed is drawn in during the cutting process and moved out subsequently to bring the end of the twine or cord within convenient reach for future use. A spring holds the twine in contact with the movable bed.

A in the drawing represents the frame of my improved twine-cutter, made of cast-iron or other material, of such form that it can be conveniently fastened to a table or counter by means of a screw, B, or wedge. To the upper end of a post or posts, $a$, projecting from the frame A, is pivoted, by a pin, $b$, a weighted frame, C. The vertical stem $d$ of the knife D is, by a pin, $e$, pivoted to the front upper end of the frame C. The knife D is an upright position, its lower cutting-edge being straight, as shown. The sides of the knife are guided in upright grooves that are provided in the frame A by means of ears $f\ f$, said grooves preventing the knife from moving in another than a vertical direction. The lower part of the frame C is, by a link or links, $g$, connected with a horizontal sliding plate or cutting-bed, E, which rests under the knife on the frame A. The weight of the frame C causes it to carry the bed E forward and the knife up, as in Fig. 1.

The twine F is, from a spool or ball, drawn through a hole, $h$, in the lower part of C, and then drawn forward over the bed. A spring, $i$, fastened to the front of C, bears upon the twine behind the knife, and holds it in contact with the bed. When twine is used for a package or other purpose it is drawn from the ball or spool without hindrance from the forward side of the machine, and used in the desired manner. When the requisite quantity has been drawn the knob $j$ on top of the stem $d$ is struck, to bring the knife quickly down and cut the thread on the bed. But this downward motion of the knife causes the frame C to swing on its pivot $b$ and draw the bed E back, so that at the time of cutting all parts will be in the position shown in Fig. 3. After the knob is released the weight will again swing forward with the bed and elevate the knife, the forward motion of the bed bringing the end of the cut twine that was behind the cutting-edge forward of the knife within convenient reach. Without this forward motion of the bed the thread would remain behind the knife and be difficult to get hold of for further use.

In order to prevent the end of the twine from being elevated by the knife, I prefer to apply a stationary wire, $l$, across the twine directly behind the knife, as shown.

Having thus described my invention, I claim as new and desire to secure by Letters Patent—

1. A twine-cutter, consisting of the frame A, pivoted weight C, knife D, and movable bed E, all arranged to operate substantially as herein shown and described.

2. The spring $i$ affixed to the pivoted weight C to bear upon the twine on the movable bed, substantially as herein shown and described.

CHARLES CARRINGTON LEWIS.

Witnesses:
T. B. MOSHER,
ALEX. F. ROBERTS. (44)